July 20, 1943.
J. CANETTA ET AL
2,324,904
REMOTE CONTROL DEVICE
Filed Jan. 30, 1942
2 Sheets-Sheet 2
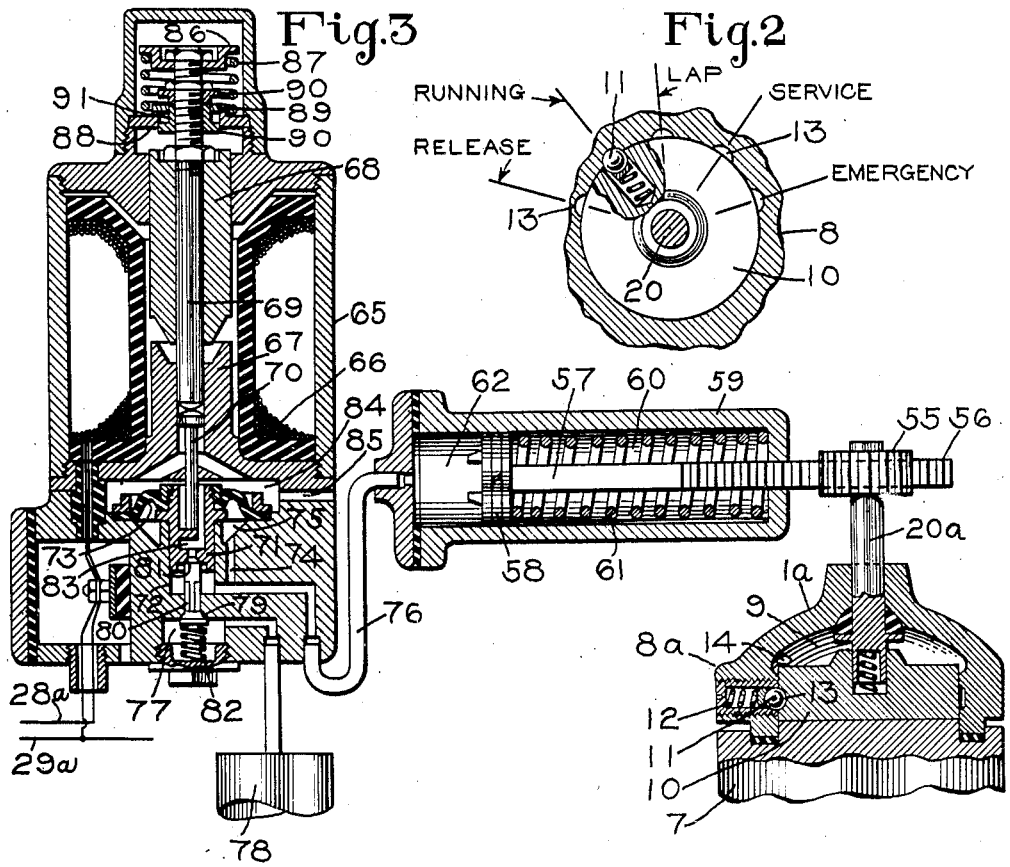
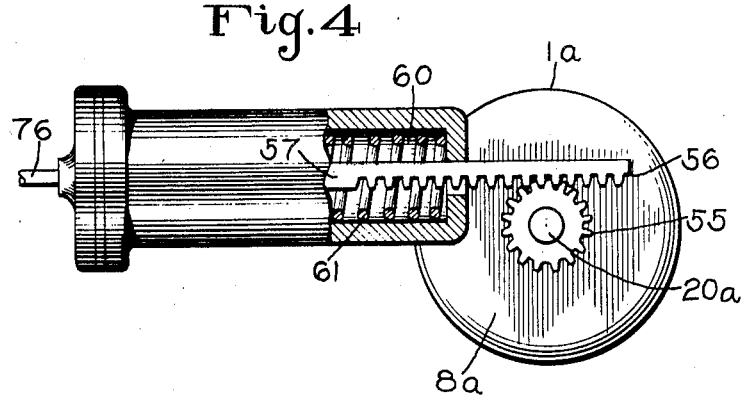
INVENTORS
JOHN CANETTA
JOHN B. GROSSWEGE
BY
*A. M. Higgins*
ATTORNEY Patented July 20, 1943

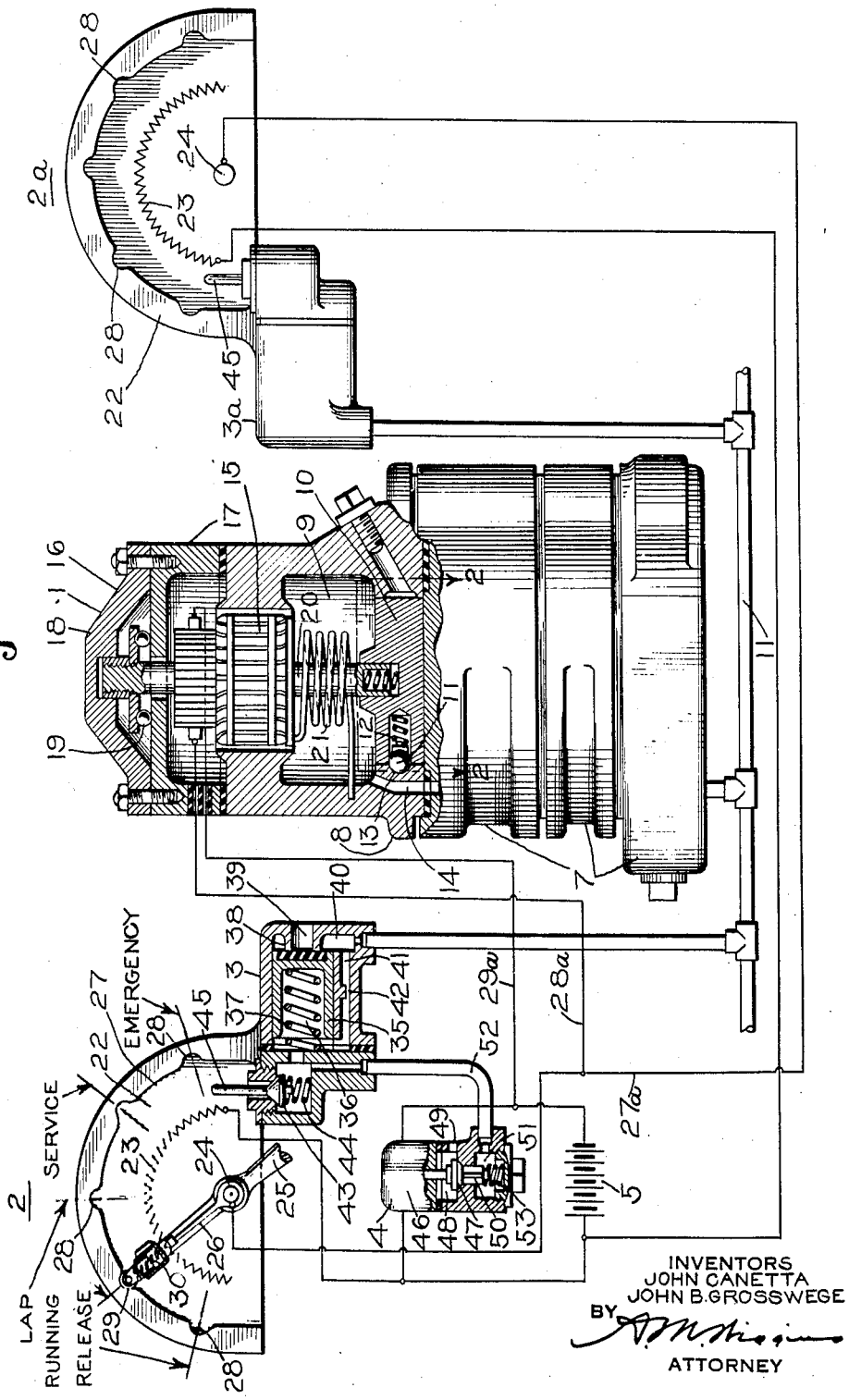

2,324,904

UNITED STATES PATENT OFFICE 2,324,904

REMOTE CONTROL DEVICE

John Canetta, Wilkinsburg, and John B. Grosswege, Edgewood, Pa., assignors to The Westinghouse Air Brake Company, Wilmerding, Pa., a corporation of Pennsylvania Application January 30, 1942, Serial No. 428,813

8 Claims. (Cl. 303—20)

This invention relates to fluid pressure brakes and more particularly to a remote manual control system therefor.

Certain types of vehicles are provided with a plurality of operator's stations from any one of which the vehicle may be controlled. For instance on double end locomotives or rail cars an operator's station is usually provided at each end of the vehicle, one station for use when the vehicle is traveling in one direction and the other station for use when the vehicle is traveling in the opposite direction. At each of these stations there is usually an engineer's brake valve device for controlling the brakes on the vehicle, or on the vehicle and a connected train in that type of service.

Where there are two brake valve devices thus provided on a vehicle, a relatively large amount of pipe is required to connect the brake valve devices with the other parts of the brake system, and some of the pipes are often relatively long for connecting the brake valve device at one end of the vehicle to the opposite end thereof.

A great amount of pipe, and particularly long pipes, are objectionable in any fluid pressure brake system not only from the standpoint of complication and cost of installation but also because the responsiveness of the brake devices tends to be reduced due to the resistance to flow of air through the pipes. Moreover a broken pipe may interfere with the safe control of brakes or possibly result in complete failure of the brake system. Thus from the standpoint of safety it is also desirable to keep the amount of pipe and the number of pipes in a fluid pressure brake system at a minimum.

One object of the invention is therefore the provision of an improved system for controlling the brakes on a double end locomotive or the like embodying only one brake valve device, the location of which is independent of an operator's station, and means arranged for remotely controlling said brake valve device from one or more remote control stations.

According to this object the single brake valve device may be located on the double end locomotive or vehicle at the point to provide most effective and efficient control of the brakes, since the location is independent of the operator's control station. The brake valve device so located is then connected to the remote manual control means at the operator's station or stations.

Such a location of the brake valve device permits the use of the shortest possible pipes connecting same into the brake system and to this extent is advantageous even over the present single end control systems in which the brake valve device is located at the engineer's station. Moreover, the elimination of one brake valve device for double end control provides for the elimination of piping incident thereto. This improved arrangement thus to a great extent overcomes the objections above described to the usual double end type of systems.

The usual engineer's brake valve device includes a rotary valve which the engineer turns through the medium of a handle to different positions for controlling the brakes on a single vehicle or train of vehicles. With the development and consequent increased complications of brake systems it has at times become desirable to control a greater member of passages through the rotary valve. To meet this requirement some rotary valves have been made larger, while in certain cases double rotary valves have been resorted to. In either case however, the changes have resulted in the requirement of greater effort to turn the rotary valve and this is undesirable from the standpoint of the engineer.

Another object of the invention is therefore the provision of a brake valve device having power means for turning the rotary valve and manually operative means for controlling the power means, whereby regardless of the resistance to turning of the rotary valve the operator may by relatively easy manipulation of the manual means selectively position the rotary valve as desired.

Other objects and advantages will be apparent from the following more detailed description of the invention.

In the accompanying drawings; Fig. 1 is a diagrammatic view, partly in section and partly in outline, of a brake valve device and remote control arrangement therefor, constructed in accordance with one embodiment of the invention; Fig. 2 is a sectional view taken on the line 2—2 in Fig. 1; Fig. 3 is a sectional view, similar to a portion of Fig. 1, of a modified form of the invention; and Fig. 4 is a plan view, partly in section, of a portion of the mechanism shown in Fig. 3.

*Description—Figures 1 and 2*

The brake valve remote control system shown in Figs. 1 and 2 comprises a power operated brake valve device 1 for controlling the brakes on a vehicle or on a vehicle and connected train, manual operated brake valve controllers 2 and 2a adapted to be located at two different control stations on the vehicle, as for instance in the cabs at the opposite ends of a double end locomotive, brake pipe vent valve devices 3 and 3a associated with the controllers 2 and 2a, respectively, a safety magnet device 4 associated with one of the vent valve devices 3 or 3a, and a source of electric current such as a battery 5.

The location of the brake valve device 1 is independent of the operator's control station on the vehicle and may therefore be such as to provide for most efficient and effective control of the brake system on a double ended vehicle, or on such a vehicle and the connected cars of a train in such service. This location on a double ended vehicle would usually be preferably intermediate the ends of the vehicle and adjacent to the brake parts to be controlled.

The brake valve device 1 may be similar to any well known manually operated type, except adapted for power control, and may therefore comprise a casing made up of one or more sections 7 mounted one on top of the other with a cover 8 mounted on the top of the uppermost section 7, said sections and cover being rigidly secured together in the usual manner. The cover 8 has a chamber 9 containing a rotary valve 10 which is mounted to turn on a seat provided on the upper face of the upper casing section 7.

The rotary valve 8 may, for the purpose of illustration, be like the rotary valve used in engineer's brake valve device which are employed for controlling the brakes on railway trains and therefore may have brake controlling positions arranged as shown and indicated by legends in Fig. 2.

As well known, the release and running positions, indicated in Fig. 2, are for the purpose of supplying fluid under pressure to a brake pipe 11 to effect a release of brakes on the vehicle or on the vehicle and a connected train. The service position is employed for effecting a service reduction in pressure in brake pipe 11 to cause a service application of brakes. The lap position is used for holding the pressure in brake pipe 11 at a desired reduced degree for limiting the degree of a service brake application. The emergency position is provided for effecting an emergency reduction in pressure in the brake pipe to effect an emergency application of brakes.

The rotary valve 10 has a bore open at the periphery thereof which contains a ball 11 and a spring 12 acting on the ball urging same outwardly into contact with the cover 8. The cover 8 has a plurality of recesses 13, spaced apart according to the spacing of the different positions above described and so arranged that the ball 11 will enter one of the recesses in each of said positions to thereby accurately define the position.

The cover 8 differs from the usual covers employed on brake valves in that it constitutes a housing for an armature 15 of a rotary magnet or torque motor 16. A spacer 17 is secured to the top of the cover 8 and a cap 18 is secured to the top of the spacer 17, the joints between the spacer and the cover and cap being air tight to prevent leakage of fluid under pressure from the interior which is open to the rotary valve chamber 9. The rotary valve chamber 9 is constantly supplied with fluid under pressure in use as by way of a passage 14, as well known.

The armature 15 is secured to and supported by a shaft 20 the lower end of which extends into and has a driving connection with the rotary valve 10. The opposite end of the shaft is journaled in cap 18 and a thrust bearing 19 interposed between the shaft and the top of the spacer 17 supports the shaft and armature 15.

A coil torque spring 21 encircles the shaft 20 below the armature 15 and has one end connected to the armature while the opposite end is anchored to the cover 8. This spring is under tension and is provided for turning the armature 15, shaft 20 and thereby rotary valve 10 in a counter-clockwise direction, as viewed in Fig. 2, in the direction of the release position. When the armature 15 is energized, as will be later described, it is adapted to turn the rotary valve 10 in a clockwise direction, as viewed in Fig. 2, against the opposing force of spring 21 to a position determined by the degree of energization of the magnet and the counterbalancing force of said spring.

The manually operative controllers 2 and 2a are provided for controlling the current supply to the rotary magnet 16 from either of two control stations.

Each of the controllers 2 and 2a comprises a base member 22 carrying a resistance coil 23 having one end connected to battery 5. A shaft 24 mounted in the base member 22 carries an operator's handle 25 and said handle carries a contactor 26 which is connected by wires 27a and 28a to one terminal of the rotary magnet 16 the other terminal of which is connected by a return wire 29a to battery 5. The contactor 26 cooperates with the coil 23 to vary the resistance in the circuit of the rotary magnet 16 in accordance with the position of the contactor and handle with respect to the base member.

The base member 22 is provided with an internal quadrant 27 arranged in concentric relation to the resistance coil 23 and shaft 24 and this quadrant has five notches 28 which are spaced from each other and adapted to receive a roller 29 which is carried in an extension of the handle 25 and urged into contact with the quadrant by a spring 30. These five notches 28 correspond to the five positions of the rotary valve 10 indicated in Fig. 2 and may bear the same legends arranged in the same order as shown in Fig. 1. Interengagement between the roller 29 and one or another of the notches 28 is intended to define the positions of the handle 25 and the position which it is desired the rotary valve 10 shall occupy.

When the handle 25 is in the release position the contactor 26 may be either off the resistance coil 23 or the whole of said resistance coil may be cut into the circuit, including battery 5 and the rotary magnet 16, in order to effect substantial complete deenergization of said magnet so that the torsion spring 21 may turn the rotary valve 10 to its release position.

If the operator turns the handle 25 from the release position in a clockwise direction toward emergency position it will be seen that the resistance coil 23 will be gradually cut out of the circuit including battery 5 and the rotary magnet 16 for increasing the degree of energization of said magnet. For instance, in running position of the handle 25 the amount of coil 23 in circuit with the rotary magnet 16 will permit energization of said magnet to an extent which will just counterbalance the force of torsion spring 21 by the time the armature 15 has turned the rotary valve 10 to running position. A sufficiently greater degree of energization of the magnet will be obtained in lap position of the handle 25 to move the armature 15 and rotary valve 10 to lap position in which position the rotary valve will be stopped by the increased force of spring 21 which counterbalances the increased magnet force. The rotary valve 10 will be moved to service and emergency positions upon movement of the handle 25 to the corresponding positions with like reductions in the amount of coil 23 in the magnet circuit, as well be apparent. In emergency position of handle 25 the coil 23 may be completely cut out to provide a maximum degree of energization of the magnet to move the rotary valve 10 to its emergency position.

Movement of the handle 25 in a counter-clockwise direction to any selected position will increase the resistance in circuit with the magnet and thus reduce the degree of energization of the magnet whereupon the torsion spring 21 will turn the rotary valve 10 in a like direction to a position where the force of the spring is reduced to substantially the same degree as the opposing reduced magnetic force of the magnet at which time the rotary valve will stop moving.

From the above it will be seen that the rotary valve 10 will move to any position predetermined by the position of handle 10 regardless of the sequence of positions to which said handle may be moved, thereby providing for normal sequence of brake controlling movements of the rotary valve 10 upon usual brake controlling operation of handle 25 by an operator.

It will be seen that the roller 29 in the handle 25 aids the operator in selecting a desired position. The ball 11 and recesses 13 in the brake valve act to accurately define the selected position of the rotary valve and thus prevent any overtravel thereof under the action either of spring 21 or the force of magnet 16.

The handle 25 and thereby the contact 26 are preferably removable from the manually operative brake controllers and only one provided per vehicle and applied to the controller at the end of the vehicle from which it is desired to control the vehicle brakes so as thereby prevent interference with the brake control from the other end of the vehicle. In the drawing the handle 25 is applied to the controller 2, there being no handle on controller 2a so that the latter is not capable of controlling the brakes. If desired however the handle 25 may be removed from controller 2 and applied to controller 2a for controlling the brakes in the same manner as above described.

By this improved system the single brake valve device 1 and the controllers 2 and 2a provide for double end control of the brakes on a locomotive without the need of relatively long pipes, or pipes incident to use of a second brake valve device such as heretofore generally employed on double end vehicles. Moreover the location of brake valve device 1 is independent of the operator's station where the controllers 2 and 2a are located and may therefore be applied to a vehicle at any point where most efficient and effective control of the brakes may be secured.

The brake pipe vent valve devices 3 and 3a are preferably associated with the controllers 2 and 2a respectively for insuring the operator's ability to cause an emergency venting of fluid under pressure from the brake pipe 11 and thereby an emergency application of brakes in case for any reason, such as failure of the control circuit through the magnet 16, the brake valve 1 fails to move in response to operation of handle 25.

Each of the vent valve devices comprises a valve piston 35 having at one side a chamber 36 containing a spring 37 which acts on the valve piston for normally holding the opposite side thereof in sealing contact with an annular seat rib 38. The seat rib 38 encircles a vent passage 39 which leads to the atmosphere and is encircled by a cavity 40 which is open to the brake pipe 11. Chamber 36 and cavity 40 are connected by a passage 41 containing a restriction 42. Normally brake pipe pressure is adapted to equalize through passage 41 into chamber 36 to render the spring 37 effective to hold the valve piston 35 in sealing contact with seat 38. A venting of fluid under pressure from chamber 36 at a rate sufficiently exceeding the capacity of restriction 42 to supply fluid under pressure to said chamber is adapted however to so reduce the pressure of fluid in said chamber, that brake pipe pressure in cavity 40 will move the valve piston away from seat rib 38 and thereby connect the brake pipe 11 to the vent passage 39. When this occurs a sudden emergency reduction in brake pipe pressure will occur through the vent passage 39 and cause an emergency application of brakes.

A poppet valve 43 is provided for venting fluid under pressure from chamber 36 as just described. This valve is normally seated by a spring 44 and has a stem 45 disposed to be engaged by the handle 25 just prior to movement of said handle into emergency position so that in said position said valve will be open and thereby cause an emergency venting of fluid under pressure from the brake pipe and consequently an emergency application of brakes. The valve 43 will be seated by spring 44 upon subsequent movement of the handle out of emergency position to permit recharging of the brake pipe as will be apparent.

The safety magnet device 4 is provided to insure the safety of the vehicle or train in case of failure of the supply of electric power and comprises a magnet 46 connected across the terminals of battery 5 so as to be normally energized. Failure of this source of electric current will result in deenergization of the magnet 46.

The magnet 46 controls a valve 47 which is contained in a chamber 48 open to the atmosphere through a passage 49. The valve 47 has a fluted stem 50 extending through a bore in the device into a chamber 51 which is connected by pipe 52 to the vent valve spring chamber 36. A spring 53 in chamber 51 acts on the stem 50 for unseating the valve 47.

When the magnet 46 is energized the valve 47 will be seated so that the valve piston 35 may be held in its normal position shown. Failure of the supply of electric current however will result in deenergization of magnet 46 under which condition spring 53 will unseat the valve 47 and thereby vent fluid under pressure from the valve piston chamber 36. The valve piston 35 will then be unseated from the seat rib 38 and cause an emergency application of brakes in the same manner as before described to thereby insure the safety of the vehicle or train.

*Description Figures 3 and 4*

In this embodiment of the invention the positioning of the brake valve device is effected by a control spring and an opposing variable air pressure in contrast to the opposing force of magnet 1 in the structure shown in Fig. 1, this variable air pressure being governed however by the degree of energization of a magnet which may be controlled from controllers 2 or 2a.

In this embodiment the brake valve device is indicated by the reference numeral 1a. This brake valve device differs from that shown in Fig. 1 in that the position defining ball 11 and spring 12 are located in the cover 8a and cooperate with recesses 13 provided in the periphery of the rotary valve 10. A shaft 20a is journaled in the cover 8a and has one end in driving contact with the rotary valve 10. The shaft 20a extends to the exterior of the cover and there is provided with a driving gear 55 which is in mesh with a rack 56 formed on the outer portion of a stem 57 secured to and projecting from one end of a piston 58.

The piston 58 is contained in a cylinder 59 having a chamber 60 at the side of the piston from which the stem 57 projects, it being noted that the rack portion 56 of said stem extends through the end wall of chamber 60. A coil spring 61 encircling the piston rod 57 within chamber 60 bears at one end against the end wall of chamber 60 and at the opposite end against the piston 58. This spring is under compression and therefore effective on the piston to urge same in the direction of the left hand, as viewed in Figs. 3 and 4, for thereby operating the gear 55 and shaft 20a to turn the rotary valve 10 in the direction of and to its release position, the same as the torsion spring 21 in the structure shown in Fig. 1.

At the opposite side of piston 58 is a chamber 62 to which fluid under pressure is adapted to be supplied and from which it is adapted to be released for opposing the pressure of spring 61 and thereby defining the position which the rotary valve 10 will occupy. It will readily be seen that the lack of fluid under pressure in chamber 62 will permit the spring 61 to move the rotary valve 10 to its release position. A sufficient degree of fluid pressure in chamber 62 to counteract the opposing pressure of spring 61 in running position of the rotary valve will position said valve in running position. A sufficiently greater increase in air pressure in chamber 62 will position the rotary valve in lap position. Further increases will position the rotary valve in service position or emergency positions. In other words the position of the rotary valve is governed by the provision of a certain definite degree of air pressure in chamber 62 for each position desired and when such pressure is obtained the rotary valve will obtain the selected position in generally the same manner as obtained by the variable degree of electromagnetic force in the structure shown in Fig. 1.

The variable air pressure in chamber 62 for controlling the positioning of piston 58 and rotary valve 10 is adapted to be provided by a magnet 65 having a coil 66 adapted to be connected to wires 28a and 29a for control by the controllers 2 or 2a.

The magnet coil 66 encircles a pole piece 67 and a portion of a coaxially aligned movable armature 68. A rod 69 extends through the armature into an aligned bore in the pole piece 67 wherein it contacts one end of a pin 70 the opposite end of which engages a plunger 71. The plunger 71 is slidably mounted in a bore 72 and is secured to the central portion of a flexible diaphragm 73 which is rigidly clamped around its edge.

The bore 72 below the plunger 71 is connected by a passage 74 to a chamber 75 below the diaphragm 73, and both said bore and chamber are connected by pipe 76 to piston chamber 62.

Below the bore 72 is a chamber 77 which is supplied with fluid under pressure from any suitable source such as a reservoir 78 and which contains a poppet valve 79 in axial alignment with plunger 71 and the magnet armature 69. This valve has a fluted stem 80 extending through a bore connecting chamber 77 to bore 72 and on the end of this stem is an exhaust valve 81 arranged to cooperate with a seat provided on the lower end of the plunger 71.

The poppet valve 79 which is subject to the pressure of a seating spring 82 urging it to its seated position is provided for supplying fluid under pressure from the reservoir 78 to bore 72 and thence to piston chamber 62 and chamber 75 below the diaphragm 73. The valve 81 is provided for releasing fluid under pressure from piston chamber 62 and diaphragm chamber 75 to a passage 83 in the plunger 71, which passage is open to a chamber 84 formed above the diaphragm and open to the atmosphere through a passage 85.

Secured to the upper end of rod 69 is a spring seat 86 engaged by one end of a spring 87 the other end of which engages a fixed washer 88. This spring is under compression and acts through the seat 86 and rod 69 on the armature with a force sufficient to counterbalance the weight of rod 69 and armature 68 to offset residual magnetism in the magnet so as to ensure prompt movement of said armature to its uppermost position upon deenergization of the magnet. The washer 88 has an elevated and inwardly extending collar 89 disposed between two spaced shoulders 90 on a spool 91 which is secured to the rod 69, engagement between these shoulders and the collar 89 being adapted to limit movement of the armature 68 in opposite directions.

In operation, when the magnet is energized to a sufficient extent to overcome the force of bias spring 87, the armature 68, rod 69, pin 70 and plunger 71 are moved downwardly and the diaphragm 73 is accordingly deflected in the same direction. After a certain slight movement of member 71 it engages the valve 81 to close the exhaust communication from bore 72, diaphragm chamber 71 and piston chamber 62 to the vent passage 83. A further slight downward movement of the armature and plunger 71 transmitted through the valve 81 and stem 80 then unseats the valve 79 whereupon fluid under pressure flows from the reservoir 78 to bore 72, piston chamber 62 and diaphragm chamber 75, it being noted that the pressure of fluid thus obtained in piston chamber 62 acts on the diaphragm 73 in opposition to the magnetic force in armature 68. As a result, fluid under pressure will continue to be supplied to piston chamber 62 until the pressure therein acting on the diaphragm is sufficient to overcome the downwardly acting force of the armature at which time the diaphragm will be deflected upwardly and permit spring 82 to close the supply valve 79 and prevent further increase in fluid pressure on diaphragm 73. In other words the device will operate to limit the pressure of fluid obtained in piston chamber 62 in accordance with the degree of energization of the magnet as governed by the amount of current in coil 66. Thus any increase in this amount of current will result in a corresponding increase in fluid pressure in piston chamber 62.

A reduction in the amount of current in magnet coil 66 will result in a corresponding reduction in magnetic force applied to the diaphragm 73. Under this condition, the pressure of fluid in piston chamber 62 acting on the diaphragm 73 will deflect same upwardly and move the plunger 71 away from the valve 81. Fluid under pressure will then be released from chamber 62 and diaphragm chamber 75 until such pressure acting on diaphragm 73 is reduced slightly below the opposing force applied through the armature 68 at which time said opposing force will deflect the diaphragm 73 downwardly and move plunger 71 into seating engagement with valve 81 to prevent further venting of fluid from chamber 62 and 75. In other words the device will operate upon a reduction in the degree of energization of the magnet to effect a corresponding reduction in the pressure of fluid in piston chamber 62.

An increase in the pressure of fluid in piston chamber 62 acting on piston 58 is adapted to move same against spring 61 to a position where it is counterbalanced by the force of the spring. A reduction in the pressure of fluid in chamber 62 on piston 58 is adapted to render the spring effective to move the piston in the opposite direction to a position where the reduced fluid pressure in chamber 62 counterbalances the reduced pressure of the spring; and since movement of the piston transmitted through rock 59 and gear 55 moves the rotary valve 10, the pressure of fluid on the piston 58 therefore determines the position of the rotary valve. Thus as before mentioned a certain pressure of fluid in chamber 62 will cause the piston 58 and rotary valve 10 to assume the running position of the rotary valve, a certain greater pressure the lap position, a still greater pressure the service position and a still higher pressure the emergency position. The lack of fluid pressure in chamber 62 will render the spring 61 effective to move the piston 58 to a position in which the rotary valve will be in release position.

Since the position of the rotary valve 10 depends upon the degree of fluid pressure in piston chamber 62 which in turn depends upon the degree of energization of the magnet, it will be seen that by the proper proportioning of the resistance 23 in the magnet circuit in the different operating position of the controllers 2 and 2a, the rotary valve 10 will be caused to assume a position corresponding to the position of handle 25 of the controller. Thus the operator by manipulating the handle 25 in the same manner as is customary in operating well known brake valves may obtain the same brake control through the corresponding operation of brake valve device 1a.

*Summary*

It will now be seen that by the use of either embodiment of the invention, only a single brake valve device is required on double end vehicles for controlling the brakes thereon or on a connected train, since this brake valve device may be controlled remotely from any one of a plurality of remote control stations. This improved arrangement thus provides for locating the brake valve device on a vehicle wherever desired to provide most efficient and effective brake control, with a minimum degree of piping and with the shortest possible pipes. Delayed response of brakes due to long pipes may therefore be minimized, and the possibility of brake failure due to a broken pipe is also minimized.

Having now described my invention, what we claim as new and desire to secure by Letters Patent is:

1. In combination, a brake valve rotary valve having a plurality of brake controlling positions, resilient means arranged to define each of said positions, a shaft for turning said rotary valve, spring means operative on said shaft to turn same and said rotary valve in one direction, electro-magnetic means operative upon energization to create a force opposing that of said spring means for turning said shaft and valve in the opposite direction, said valve being turned by the predominating force to a position in which the opposing forces substantially equalize, and manual means selectively operative to provide various degrees of energization of said electro-responsive means which will provide said substantial equalization of forces in any selected one of said plurality of positions.

2. In combination, a brake valve rotary valve having a plurality of brake controlling positions, a shaft for turning said rotary valve, spring means operative on said shaft to turn same and said rotary valve in one direction, electro-magnetic means operative upon energization to create a force opposing that of said spring means for turning said shaft and valve in the opposite direction, said valve being turned by the predominating force to a position in which the opposing forces substantially equalize, a manual controller for said electro-magnetic means comprising a movable lever having positions corresponding to the positions of said rotary valve, an adjustable electric current control means for said electro-magnetic means arranged for adjustment by said lever in each position thereof to provide for said substantial equalization of forces in the corresponding position of said rotary valve.

3. The combination with a control member adapted to be selectively moved to any one of a plurality of different positions, spring means under pressure, a movable abutment connected to said member and subject to the pressure of said spring means and the opposing pressure of fluid in a chamber and being operable by and in a direction dependent upon the greater of the two opposing pressures to a position in which the pressure of said spring means substantially equalizes with the opposing fluid pressure, an electro-magnet, means subject to the opposing forces of said electro-magnet and of fluid in said chamber, operative upon energization of said magnet to supply fluid to said chamber at a pressure proportional to the degree of such energization, and manual means operative to selectively provide various degrees of energization of said electro-magnet as required to provide substantial equalization of the opposing pressures on said abutment in any selected one of said plurality of positions.

4. In combination, a rotary valve of a brake valve device having a plurality of different brake controlling positions, motor means operable by fluid under pressure to turn said valve to a position depending upon the pressure of said fluid, electro-magnetic means operative upon energization to provide fluid in said motor means at a pressure proportional to the degree of energization, manual means having positions corresponding to the positions of said valve, and current control means for said electro-magnetic means adjustable by said manual means to provide in each position of said manual means for energization of said electro-magnetic means to a degree to provide a fluid pressure in said motor means to move said valve to the corresponding position.

5. In combination, a brake valve device operative to control application and release of brakes, electro-responsive means operative to control the operation of said brake valve device, a manual controller for controlling said electro-responsive means and having one position for effecting the operation thereof to effect operation of said brake valve device to cause a release of brakes and having another position for effecting operation of said electro-responsive means to effect operation of said brake valve device to cause an application of brakes, and means separate from said brake valve device operative by said controller in its said other position to also effect an application of brakes.

6. In combination, a brake pipe, a brake valve device having one position to supply fluid under pressure to said brake pipe and another position to vent fluid under pressure from said brake pipe, electro-responsive means operative to control the position of said brake valve device, a manual controller for controlling said electro-responsive means and comprising a lever having one position to effect operation of said electro-responsive means to cause operation of said brake valve device to supply fluid under pressure to said brake pipe and having another position to effect operation of said electro-responsive means to cause operation of said brake valve device to vent fluid under pressure from said brake pipe, a valve device operative to vent fluid under pressure from said brake pipe independent of said brake valve device, said lever being operative to actuate said valve device upon movement to said other position.

7. In combination, a brake valve device operative to control application and release of brakes, electro-responsive means for controlling the operation of said brake valve device, a manual controller having one position of a connecting said electro-responsive means with said source of current to effect energization of said electro-responsive means to cause operation of said brake valve device to effect an application of brakes and having another position for effecting operation of said electro-responsive means and thereby said brake valve device to effect a release of brakes, and brake application means separate from said brake valve device and connected with said source of current for constant energization thereby, deenergization of said brake application means upon failure of said current being operative to also effect an application of brakes.

8. In combination, a brake pipe, a brake valve device having one position to supply fluid under pressure to said brake pipe and another position to vent fluid under pressure from said brake pipe, electro-responsive means for controlling the operation of said brake valve device, a source of electric current, a manual control lever having one position for connecting said source of current with said electro-responsive means to effect operation thereof to cause operation of said brake valve device to vent fluid under pressure from said brake pipe and having another position to cause operation of said electro-responsive means to effect operation of said brake valve device to supply fluid under pressure to said brake pipe, a vent valve device for venting fluid under pressure from said brake pipe independent of said brake valve, means operative by said lever upon movement thereof to said one position to actuate said vent valve device, an electromagnet device operative upon deenergization to also actuate said vent valve device, and means connecting said electro-magnet device with said source of current providing for constant energization thereof by said current and deenergization thereof upon failure of said current.

JOHN CANETTA.
JOHN B. GROSSWEGE.